F. W. WORATZECK.
CORN PLANTER AND HILL MARKER.
APPLICATION FILED OCT. 31, 1913.
1,211,265.
Patented Jan. 2, 1917.
2 SHEETS—SHEET 1.
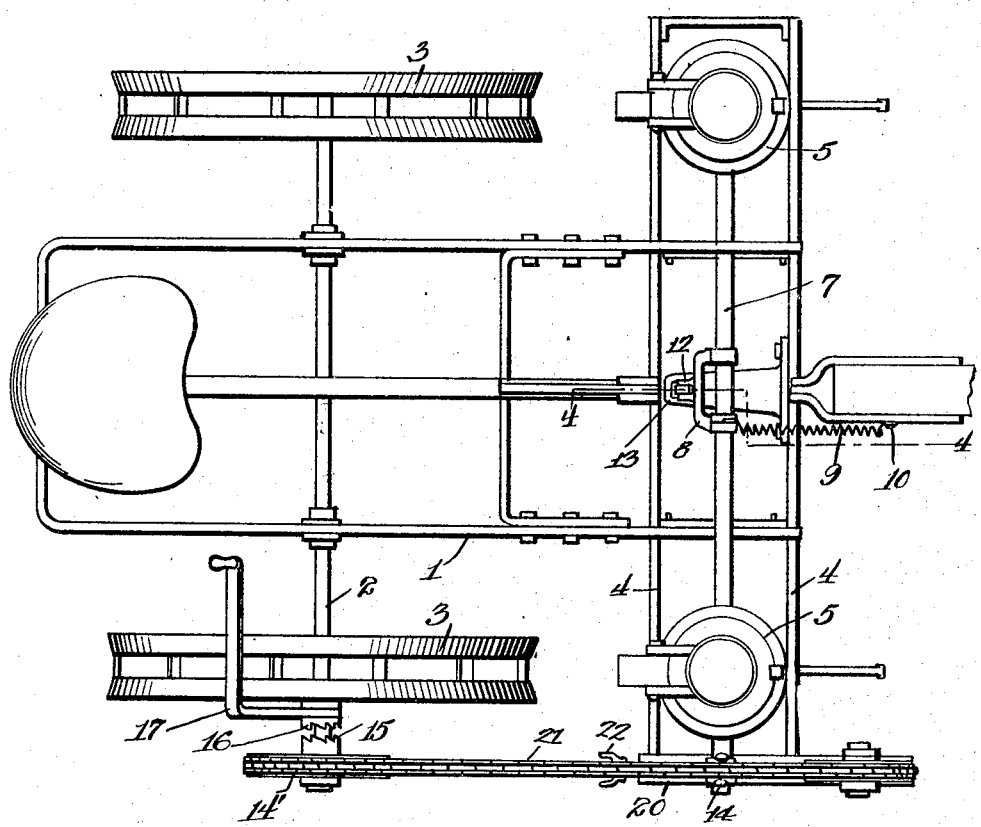
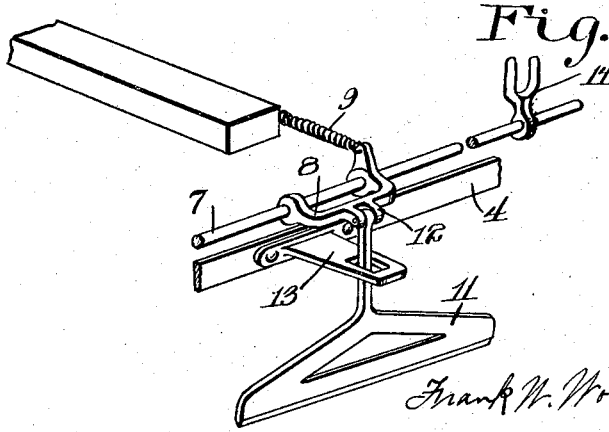

F. W. WORATZECK.
CORN PLANTER AND HILL MARKER.
APPLICATION FILED OCT. 31, 1913.

1,211,265.

Patented Jan. 2, 1917.
2 SHEETS—SHEET 2.

UNITED STATES PATENT OFFICE.

FRANK W. WORATZECK, OF TRENTON, ILLINOIS.

CORN-PLANTER AND HILL-MARKER.

1,211,265.  Specification of Letters Patent.  Patented Jan. 2, 1917.

Application filed October 31, 1913. Serial No. 798,536.

*To all whom it may concern:*

Be it known that I, FRANK W. WORATZECK, a citizen of the United States, residing at Trenton, in the county of Clinton and State of Illinois, have invented certain new and useful Improvements in Corn-Planters and Hill-Markers, of which the following is a specification.

The object of this invention is to provide a corn planter or like seeding mechanism with check row means for controlling the release of corn or seed and also marking the land adjacent the hill of corn.

It is one of the objects of this invention to provide a rock shaft for controlling the release of corn or seed from the depositing means, and also arranged to operate a marker, said shaft being operated by an endless check row line, connected to be driven from the axle of the planter.

The device of my invention will be further described in connection with the accompanying drawings and will be more particularly pointed out and ascertained in and by the appended claim.

Figure 2:
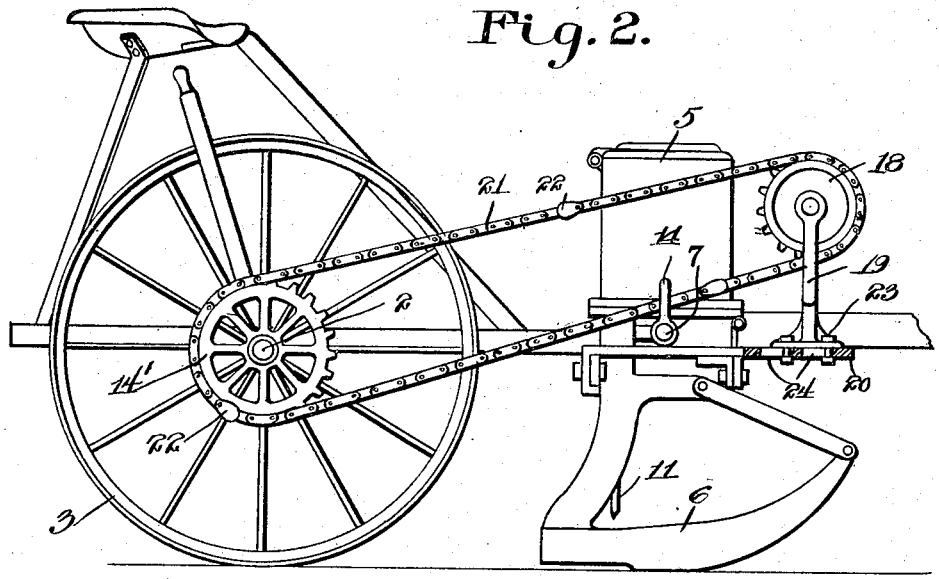
Figure 4:
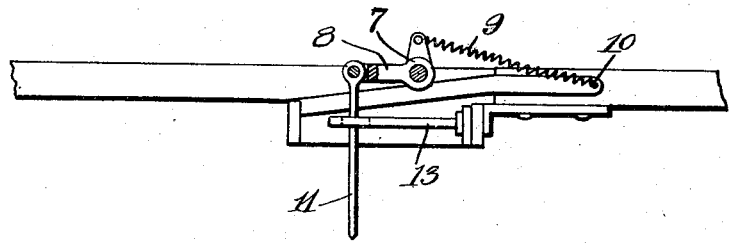

In the drawings:—Figure 1 is a plan view of a planter embodying one form of my invention. Fig. 2 is a view in side elevation thereof. Fig. 3 is a perspective view of a portion of the lock shaft showing its connection with the land marker. Fig. 4 is a sectional view on line 4—4 of Fig. 1.

Like characters of reference designate similar parts throughout the different figures of the drawings.

As illustrated, the device of my invention includes a frame, generally indicated at 1, which is mounted upon an axle 2 supported by bearing wheels 3. A seeder or planter frame, generally indicated at 4 is mounted transversely of the main frame 1 and is provided with depositing mechanism which may include containers or hoppers 5 delivering to the shoes or furrow openers 6.

Release of the seed or corn from the containers 5 to the shoes 6 is controlled in any suitable manner by a rock shaft 7 which is journaled in suitable bearings on the planter frame 4. The rock shaft 7 is provided with a bracket arm 8 to which a contractile spring 9 may be connected, the remaining end of the spring being connected with the tongue at 10, to normally hold the rock shaft in the position shown. A land or hill marker 11 is connected at 12, with said bracket, and is guided by an arm 13 for vertical movement when the shaft 7 is rocked. The shaft 7 is provided with a trip arm 14, which is preferably bifurcated, and which is disposed near one end of the shaft 7.

Mounted on the axle 2, is a wheel 14′, which may be a sprocket wheel, and which is provided with clutch teeth 15 on the hub thereof. A clutch member 16, provided with clutch teeth, is slidably keyed on the axle 2 and may be controlled by a lever 17 so as to connect or disconnect the sprocket wheel 4 into or out of driven relation with respect to the axle 2. An idler wheel 18, which is also in the form of a sprocket wheel, is mounted in an upright 19 which is adjustable longitudinally upon a support 20 extending forwardly from and secured to the planter frame 4. A check line, preferably in the form of a sprocket chain 21, is trained about the wheels 14′ and 18, and is provided with equi-distantly spaced trip arm actuating elements 22 for engagement with the trip arm 14. The chain 21 is contractible or expandible, as regards its length, by removing or inserting additional links, so that the spacing of the trip actuating elements 22 can be governed in accordance with the distance between the hills desired. If the corn is to be planted closer than the adjustment shown in Fig. 2, one or more links will be taken out of the chain between each of the elements 22 so as to retain the equi-distant disposition thereof with respect to each other, and the upright 19 will be correspondingly adjusted by means of the bolts and slots 23 and 24 so that slack in the chain can be taken up and the idler 18 adjusted to keep the chain taut irrespective of its length.

It will be further noted that the shaft 7 not only actuates the marker 11, but controls release of the corn or like seed in the depositing means thereby insuring simultaneous marking of the land at the time seed is dropped by actuation of a single shaft.

It is believed that the advantages and utility of my invention will be clearly understood from the foregoing description, and while I have herein shown and described one specific form of the invention, I do not wish to be limited thereto except for such limitations as the claim may import.

I claim:—

A planter and hill marker comprising a main frame, seed depositing means carried by said frame, a rock shaft mounted across the frame for controlling release of the seed from said depositing means, a bracket arm mounted on the shaft in a rigid relation to extend in a substantially horizontal plane therefrom, an upstanding arm provided on said bracket arm, a spring connected from said upstanding arm to the frame to normally hold the rock shaft in a relation to close the outlet from the seed depositing means, a land or hill marker connected pivotally to said bracket arm to depend downwardly therefrom, an arm mounted on the frame extended to embrace and carry said marker in a vertical path of movement into and out of the earth as the rock shaft may be turned, and means to turn the rock shaft at predetermined intervals to open the passage for the deposit of seeds and to simultaneously bring the marker in a vertically downward path of movement to be sunk into the earth to establish markings to identify the position of deposit of the seeds.

In testimony whereof I affix my signature in presence of two witnesses.

FRANK W. WORATZECK.

Witnesses:
ALFRED GINZEL,
JACOB SPECHT.

Copies of this patent may be obtained for five cents each, by addressing the "Commissioner of Patents Washington, D. C."